July 23, 1935.   P. E. BAKER ET AL   2,008,811
BRAKE DRUM
Original Filed June 13, 1932
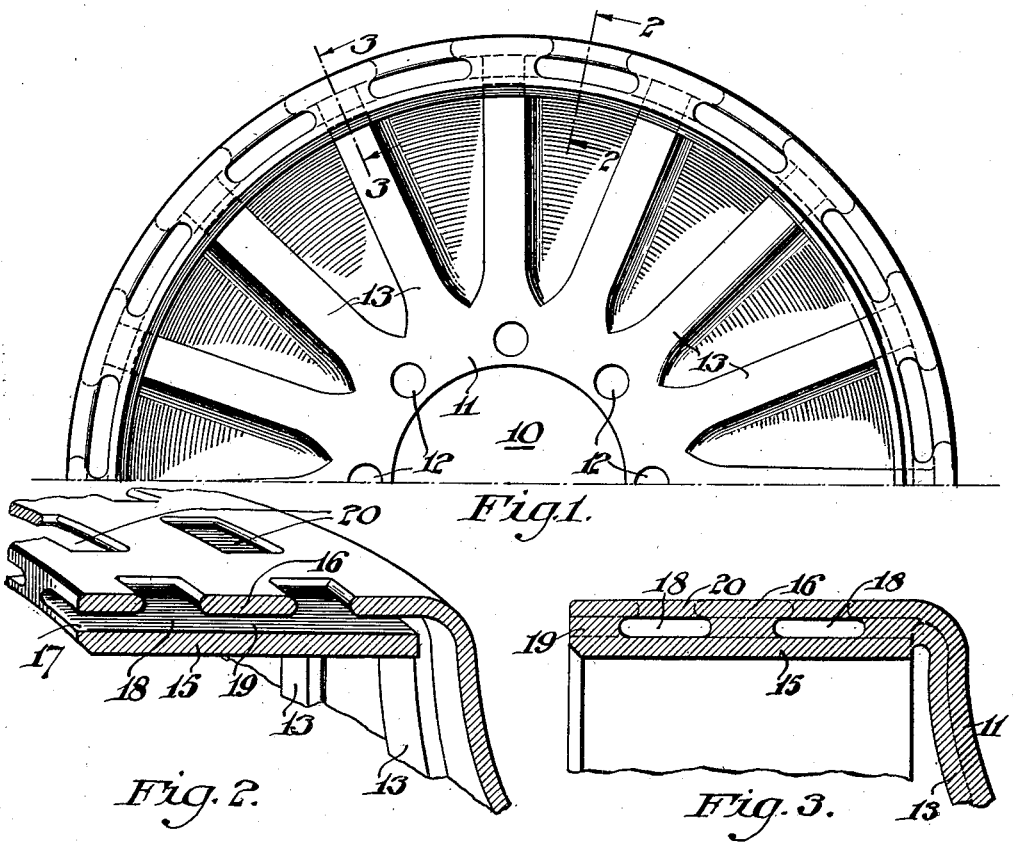
Fig. 1.
Fig. 2.   Fig. 3.
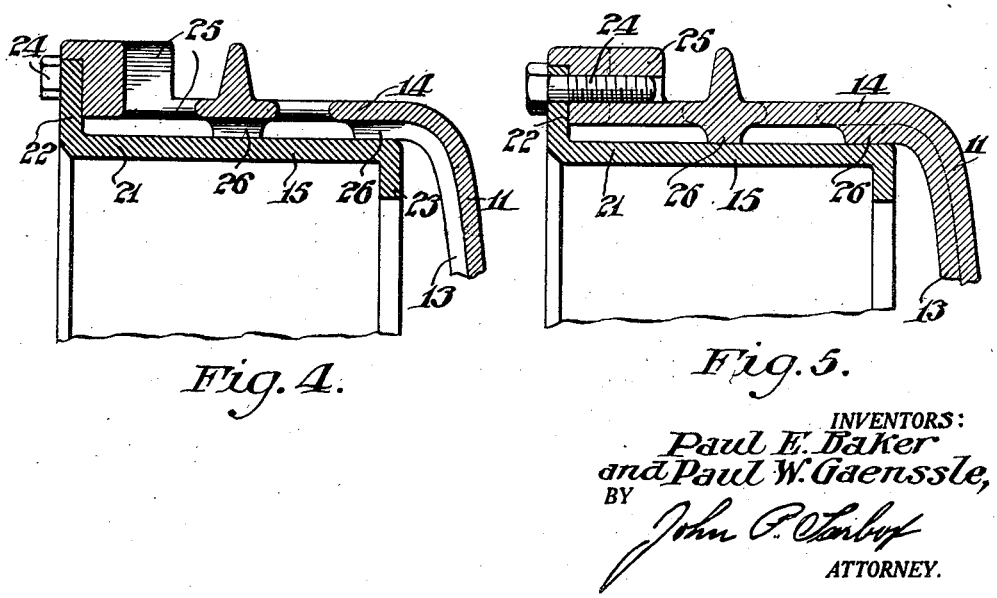
Fig. 4.   Fig. 5.
INVENTORS:
Paul E. Baker
and Paul W. Gaenssle,
BY
ATTORNEY.

Patented July 23, 1935

2,008,811

UNITED STATES PATENT OFFICE 2,008,811

BRAKE DRUM

Paul E. Baker and Paul W. Gaenssle, Detroit, Mich., assignors to Budd Wheel Company, Philadelphia, Pa., a corporation of Pennsylvania Application June 13, 1932, Serial No. 616,824
Renewed June 4, 1935

7 Claims. (Cl. 188—218)

The invention relates to vehicle brake drums and particularly to the cooling of such brake drums in order to obtain therefrom the maximum efficiency in use.

The prime object of our invention is to adequately cool vehicle brake drums in such a manner as to increase their efficiency and to effect this cooling in the simplest manner possible. Other objects relate to improved detail, and the provision of a removable braking portion.

Broadly, we have achieved the objects of our invention by providing passages within the braking portion of the brake drum, whereby air may be circulated through the drum in order to cool the same. We have also provided novel means for the demountable securement of a braking member.

Other objects and advantages will be apparent in the reading of the sub-joined specifications in light of the attached drawing, in which Figure 1 is a partial elevational view of a brake drum embodying our invention.

Figure 2 is a cross sectional view taken on line 2—2 of Figure 1.

Figure 3 is a cross sectional view taken on line 3—3 of Figure 1.

Fig. 4 is a cross sectional view through a modified form of our invention, taken on a line corresponding to line 2—2 of Figure 1.

Figure 5 is a view of the device of Figure 4, taken on a line corresponding to line 3—3 of Figure 1.

Referring now to the drawing by reference characters, drum 10 consists of a radially extending mounting plate 11 having an annular series of equally spaced securing holes 12 through which the drum, as a whole, is adapted to be secured to the usual wheel hub, not shown. The inner axial face of the mounting plate 11 is provided with a series of radially extending ribs 13 extending over substantially the entire surface of the mounting plate. Drum 10 is further provided with an axially extending portion indicated generally by numeral 14, consisting of a braking portion 15 of cylindrical contour and an outer surface portion 16, also of cylindrical contour.

Referring particularly to Figures 2 and 3, which show a cast brake drum, we have provided, between the braking portion 15 and the outer surface portion 16, a series of cored slots or passages 17 extending axially, radially, and circumferentially of the drum. We have preferred to make the circumferential passages 18 continuous as shown clearly in the respective figures. The axially extending passages 19 are of suitable width and extend across the axially extending portion 14 of the drum in angularly spaced relationship with respect to the radially extending ribs 13 in the mounting plate 11. The radially extending passages 20 are arranged in series axially and radially adjacent the continuous circumferental passages 18. These radially extending passages 20 open outwardly to the exterior surface of the outer portion 16.

The ribs 13 and mounting plate 11, and the axially extending passages 19 are so arranged in radial alignment that a continuous passage of air is forced outwardly of the mounting plate and across the axially extending portion 14 of the drum. It will be seen that the ribs 13 in the mounting plate 11 tend to act as vanes, stirring up the air within the drum, and inducing a centrifugal flow of air outwardly toward the braking portion 15. This centrifugal flow of air is carried axially into the braking portion 15 by passages 19. This flow of air is augmented by a circumferential flow passing through passages 18, in and out of the radial passages 20.

By such provision for air circulation entirely surrounding the braking portion 15, we have adequately cooled this portion, thus avoiding the serious consequences of over-heating, which consequence usually takes the form of bell mouthing, irregular expansion and uneven wear. We have increased the service life of the brake drum many times by such provision. It will be appreciated that the circulation of air throughout the various passages indicated generally by numeral 17 causes the heat generated by repeated braking actions to be conveyed away from the braking portion 15 and into the open air.

In the modification shown in Figures 4 and 5, we have provided a removable braking portion 21, having radially extending marginal flanges 22 and 23, through the outer flange 22 of which the removable portion 21 is secured by means of an annular series of axially extending studs 24 to bosses 25 on the axially extending portion 14 of the drum 10. The inner surface 26 of the axially extending portion 14 is provided with ribbed formations, the spaces between which are very much the same as those described in connection with Figures 1, 2 and 3, embodying axially, radially, and circumferentially extending passages, through which air circulates to cool the drum. By providing a removable braking portion we are able to effect a replacement of this portion at such time that excessive wear has taken place, and by providing ribbed portions in the inner surface 26 of the axially extending portion 14, we obtain the desired passages for the circulation of air, as well as supports for the removable portion 21.

It will be seen that the objects of our invention are achieved in the manner characterized by simplicity and general utility. The cored passages in the respective castings shown afford ample provision for the passage and circulation of air therethrough, insuring adequate cooling of the drum as a whole, and lengthening the service life of the drum. By a simple arrangement we have been able to make the braking portion removable, in conjunction with a ribbed securing member, the assembly of which members incorporates the same system of air passages as does the unitary drum. It will be understood that while the invention is particularly applicable to cast brake drums, it is entirely possible that the cored passages therein might be formed in other types of drums.

We are aware that many modifications of our invention may be made without departing from the spirit thereof, and we do not wish to be limited to the circumstantial terminology of the specifications but rather solely by the scope of the appended claims.

What we claim is:

1. A brake drum comprising, in combination, a mounting portion, a braking portion, and passages within said braking portion, through which passages air is circulated to cool the drum, said passages comprising a plurality of annularly continuous passages, a plurality of axially extending passages therein, said last-named passages being in continuation of continuous slotted portions in said mounting portion and radially extending passages interconnecting intersecting areas of said axial and annular passages at the outer surface of said braking portion.

2. A brake drum comprising, in combination, a mounting portion, a braking portion, passages within said braking portion, and ribs in said mounting portion adapted to circulate air through said passages to cool the drum.

3. A brake drum having an axially extending passage, a radially extending passage and a passage extending circumferentially a substantial distance within the braking portion thereof.

4. A brake comprising a perforate outer cylinder, an imperforate braking cylinder spaced radially inwardly thereof, means interbracing and supporting the cylinders each to each and shaped to provide symmetrical axial and peripheral passages between the cylinders, and a drum head having radial vanes for directing air to the passages between the cylinders.

5. A brake comprising a braking cylinder having radially outwardly and inwardly projecting flanges at its respective ends, and a mounting member including a cylinder and an integral drum head at one end of its cylinder, the mounting member cylinder having radial side openings and being nested over the braking cylinder in spaced relation thereto with its drum head in adjacent axially-spaced relation to the end of the braking cylinder having the inward flange, the mounting member cylinder also having portions seating it on said outwardly extending flange and spacing it from the braking cylinder to therewith form axial and peripheral passages between the cylinders, and the drum head having a radially inner mounting portion and forming radial passages communicating with the passages between the cylinders.

6. A brake comprising a cast metal unit having all of its parts homogeneously integrally united to each other and comprising a braking cylinder having cored axial and peripheral passages between its inner and outer cylindrical surfaces and cored radial passages in its outer surface communicating with said first passages, the unit also including a drum head homogeneously integral with the cylinder having a radially inner mounting portion and radial passages directed toward, and communicating with, the cylinder passages.

7. A brake including a spaced wall cylinder defining intersecting axial and circumferential air passageways between the walls and a drum head including means communicating with the space between the cylinder walls for forcing air radially outwardly along the head and axially between the walls.

PAUL E. BAKER.
PAUL W. GAENSSLE.